US012366816B2

(12) United States Patent
Sasaki et al.

(10) Patent No.: US 12,366,816 B2
(45) Date of Patent: Jul. 22, 2025

(54) ELECTROPHOTOGRAPHIC MEMBER, PROCESS CARTRIDGE, AND ELECTROPHOTOGRAPHIC IMAGE FORMING APPARATUS

(71) Applicant: CANON KABUSHIKI KAISHA, Tokyo (JP)

(72) Inventors: Ayumi Sasaki, Shizuoka (JP); Kazuaki Nagaoka, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 142 days.

(21) Appl. No.: 18/329,775

(22) Filed: Jun. 6, 2023

(65) Prior Publication Data

US 2024/0004326 A1 Jan. 4, 2024

(30) Foreign Application Priority Data

May 26, 2023 (JP) ................................. 2023-087072

(51) Int. Cl.
*G03G 15/08* (2006.01)
*G03G 21/18* (2006.01)

(52) U.S. Cl.
CPC ..... *G03G 15/0818* (2013.01); *G03G 15/0808* (2013.01); *G03G 21/1814* (2013.01); *G03G 2215/0861* (2013.01)

(58) Field of Classification Search
CPC ........... G03G 15/0808; G03G 15/0818; G03G 21/1814; G03G 2215/0858; G03G 2215/0861
See application file for complete search history.

(56) References Cited

U.S. PATENT DOCUMENTS

| | | | |
|---|---|---|---|
| 7,727,134 B2 | 6/2010 | Nakamura |
| 7,797,833 B2 | 9/2010 | Nakamura |
| 8,176,632 B2 | 5/2012 | Kawamura |
| 8,745,870 B2 | 6/2014 | Kawamura |
| 9,625,854 B2 | 4/2017 | Koyanagi |

(Continued)

FOREIGN PATENT DOCUMENTS

| | | | |
|---|---|---|---|
| EP | 3 715 959 A1 | 9/2020 |
| JP | 4-76577 A | 3/1992 |

(Continued)

*Primary Examiner* — Gerard Higgins
(74) *Attorney, Agent, or Firm* — VENABLE LLP

(57) ABSTRACT

Provided is an electrophotographic member including: an electroconductive substrate; and an elastic layer on the substrate, the elastic layer constituted by a single layer, the elastic layer containing a silicone rubber having a dimethylsiloxane structure, wherein when a peak top temperature of an ion thermogram derived from the dimethylsiloxane structure, the ion thermogram being measured from a first sample sampled from a first region having a thickness of 0.5 μm from a first surface of the elastic layer toward a second surface thereof, is represented by T1, and a peak top temperature of an ion thermogram derived from the dimethylsiloxane structure, the ion thermogram being measured from a second sample sampled from a second region corresponding to a thickness of 1.0 μm to 1.5 μm from the second surface toward the first surface, is represented by T2, T1 and T2 satisfy a relationship of T1>T2.

12 Claims, 3 Drawing Sheets

(56) References Cited

U.S. PATENT DOCUMENTS

| | | | |
|---|---|---|---|
| 9,846,407 | B2 | 12/2017 | Nakamura |
| 10,539,891 | B1 | 1/2020 | Ishii |
| 10,571,825 | B1 | 2/2020 | Urushihara |
| 10,678,161 | B2 | 6/2020 | Tsuru |
| 10,705,449 | B2 | 7/2020 | Ishida |
| 10,712,684 | B2 | 7/2020 | Wakabayashi |
| 10,831,126 | B2 | 11/2020 | Matsunaga |
| 10,831,127 | B2 | 11/2020 | Utsuno |
| 10,942,471 | B2 | 3/2021 | Ogawa |
| 11,465,383 | B2 | 10/2022 | Yamaguchi |
| 11,650,516 | B2 | 5/2023 | Uesugi |
| 2014/0072350 | A1 | 3/2014 | Urushihara |
| 2015/0248101 | A1 | 9/2015 | Hayashi |
| 2020/0004170 | A1 | 1/2020 | Ishii |
| 2020/0172701 | A1 | 6/2020 | Tanaka |
| 2020/0310282 | A1 | 10/2020 | Sugiyama |
| 2022/0236663 | A1 | 7/2022 | Uesugi |
| 2022/0276579 | A1 | 9/2022 | Nishi |

FOREIGN PATENT DOCUMENTS

| | | | | | |
|---|---|---|---|---|---|
| JP | 06329909 | A | * | 11/1994 | ............. C08G 77/34 |
| JP | 2014-197064 | A | | 10/2014 | |
| JP | 2017-49282 | A | | 3/2017 | |
| JP | 2020-8847 | A | | 1/2020 | |
| JP | 2020-166227 | A | | 10/2020 | |
| JP | 2020-170158 | A | | 10/2020 | |
| JP | 2021-176003 | A | | 11/2021 | |

* cited by examiner

ELECTROPHOTOGRAPHIC MEMBER, PROCESS CARTRIDGE, AND ELECTROPHOTOGRAPHIC IMAGE FORMING APPARATUS

BACKGROUND

Technical Field

The present disclosure relates to an electrophotographic member to be incorporated into an apparatus adopting an electrophotographic system. The present disclosure also relates to a process cartridge and an electrophotographic image forming apparatus each using the electrophotographic member.

Description of the Related Art

In an electrophotographic image forming apparatus, an image-bearing member is charged by a charging member, and an electrostatic latent image is formed thereon by exposure light. Next, toner in a developer container is applied onto a developing member by a toner-supplying member and a toner-regulating member, and the electrostatic latent image formed on the image-bearing member is developed with the toner in a portion where the image-bearing member and the developing member are brought into contact with each other, or a region near the portion. After that, the toner on the image-bearing member is transferred onto a recording sheet by a transferring unit, and is fixed by heat and a pressure. In addition, the toner remaining on the image-bearing member even after the transfer is removed by a cleaning blade.

Electrophotographic members to be used in such electrophotographic image forming apparatus, such as the developing member, the charging member, the toner-supplying member, and the toner-regulating member, have each been required to have such a property that its performance in an initial state is not reduced even by its long-term use, that is, excellent durability. Further, along with a recent demand for lower power consumption, toner that can be fixed even at low temperatures has started to be used. Such toner is relatively liable to deteriorate. Accordingly, further suppression of the deterioration of the toner has also been required.

In view of the foregoing, to further suppress the deterioration of the toner, a soft silicone rubber is sometimes used in such electrophotographic member from the viewpoint of a further reduction in stress to the toner. A siloxane bond in the main chain of the silicone rubber has a spiral structure, and the spiral structure peculiar to the silicone rubber expresses various characteristics that are not observed in an organic polymer whose main chain is formed of a C—C bond. Thus, the silicone rubber has stable rubber elasticity in a temperature range wider than those of a natural rubber and any other synthetic rubber, and is excellent in heat resistance and cold resistance. Meanwhile, the silicone rubber is still susceptible to improvement in terms of wear resistance.

In Japanese Patent Application Laid-Open No. H04-76577, there are disclosures of a silicone rubber elastic body, which is improved in wear resistance by mixing a silicone rubber with a silane coupling agent, and a developing member using the elastic body.

SUMMARY

At least one aspect of the present disclosure is directed to providing an electrophotographic member, which can achieve both of suppression of wear of its surface and suppression of deterioration of toner at higher levels even when used in formation of an electronic image under a high-temperature and high-humidity environment over a long time period. In addition, at least one aspect of the present disclosure is directed to provide a process cartridge conducive to stable formation of a high-quality electrophotographic image. Further, at least one aspect of the present disclosure is directed to providing an electrophotographic image forming apparatus that can stably form a high-quality electrophotographic image.

According to at least one aspect of the present disclosure, there is provided an electrophotographic member including: an electroconductive substrate; and an elastic layer on the substrate, wherein the elastic layer is constituted by a single layer. The elastic layer contains a silicone rubber having a dimethylsiloxane structure. When a side of the elastic layer facing the substrate is defined as a second surface, and a surface of the elastic layer opposite to the second surface is defined as a first surface, and when a peak top temperature of an ion thermogram derived from the dimethylsiloxane structure, the ion thermogram being measured from a first sample sampled from a first region having a thickness of 0.5 μm from the first surface toward the second surface, is represented by T1 (° C.), and a peak top temperature of an ion thermogram derived from the dimethylsiloxane structure, the ion thermogram being measured from a second sample sampled from a second region corresponding to a thickness of 1.0 μm to 1.5 μm from the second surface of the elastic layer toward the first surface, is represented by T2 (° C.), T1 and T2 satisfy a relationship represented by the following formula (1).

$$T1>T2 \quad \text{Formula (1)}$$

Further, according to at least one aspect of the present disclosure, there is provided a process cartridge removably mountable onto a main body of an electrophotographic image forming apparatus, the process cartridge including the above-mentioned electrophotographic member.

Further, according to at least one aspect of the present disclosure, there is provided an electrophotographic image forming apparatus including: an image-bearing member for bearing an electrostatic latent image; a charging device for primarily charging the image-bearing member; an exposing device for forming an electrostatic latent image on the image-bearing member that is primarily charged; a developing member for developing the electrostatic latent image with toner to form a toner image; and a transferring device for transferring the toner image onto a transfer material, wherein the developing member is the above-mentioned electrophotographic member.

Further features of the present disclosure will become apparent from the following description of exemplary embodiments with reference to the attached drawings.

DESCRIPTION OF THE EMBODIMENTS

Figure 1:
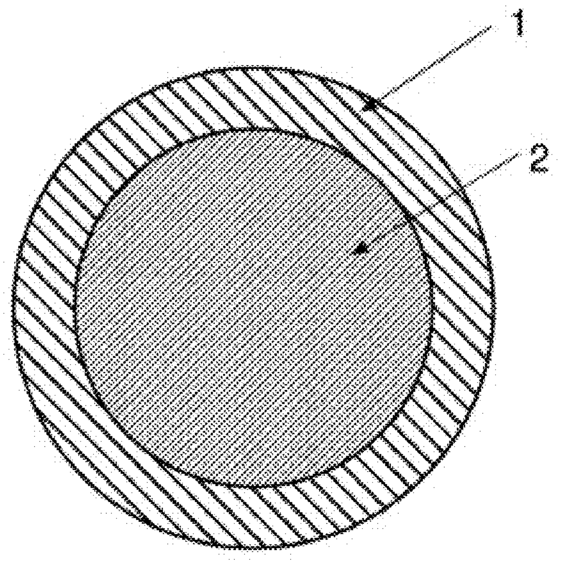
FIG. 1 is a conceptual view for illustrating an example of an electrophotographic member according to one aspect of the present disclosure.

The inventors have investigated a developing roller using the silicone rubber material according to the invention described in Japanese Patent Application Laid-Open No. H04-76577. As a result, although the developing roller showed excellent wear resistance, when the roller was used in the formation of many electrophotographic images under a high-temperature and high-humidity environment, filming resulting from deteriorated toner occurred on an outer surface (toner-carrying surface) of the developing roller to result in a reduction in quality of each of the electrophotographic images in some cases.

The occurrence of the filming on the outer surface of the developing roller may result from an increase in hardness of the silicone rubber according to the invention described in Japanese Patent Application Laid-Open No. H04-76577 by the action of the silane coupling agent. That is, the inventors have assumed that the filming occurred on the outer surface of the developing roller because the toner received a larger amount of stress from the developing roller owing to the increase in hardness of the elastic layer of the roller containing the silicone rubber, and hence the deterioration of the toner was accelerated.

In view of the foregoing, the inventors have made investigations with a view to obtaining a developing roller having a surface improved in wear resistance while suppressing an increase in stress to be applied to toner. As a result, the inventors have found that the following is effective in achieving both of the maintenance of the flexibility of an elastic layer containing a silicone rubber containing a dimethylsiloxane structure and an improvement in wear resistance of an outer surface of the elastic layer: the molecular mobility of the silicone rubber in a region having a thickness of 0.5 μm from the outer surface in its depth direction (hereinafter also simply referred to as "surface region") is made lower than the molecular mobility of the silicone rubber present in a region deeper than the surface region.

That is, an electrophotographic member according to at least one aspect of the present disclosure includes an electroconductive substrate, and an elastic layer arranged on the substrate. The elastic layer is constituted by a single layer, i.e. a monolayer elastic layer. The elastic layer contains a silicone rubber containing a dimethylsiloxane structure. When a side of the elastic layer facing the substrate is defined as a second surface, and a surface of the elastic layer opposite to the second surface is defined as a first surface, and when a peak top temperature of an ion thermogram derived from the dimethylsiloxane structure, the ion thermogram being measured from a first sample sampled from a first region (surface region) having a thickness of 0.5 μm from the first surface toward the second surface, is represented by T1 (° C.), and a peak top temperature of an ion thermogram derived from the dimethylsiloxane structure, the ion thermogram being measured from a second sample sampled from a second region corresponding to a thickness of 1.0 μm to 1.5 μm from the second surface of the elastic layer toward the first surface, is represented by T2 (° C.), T1 and T2 satisfy a relationship represented by the following formula (1).

$$T1>T2 \quad \text{Formula (1)}$$

The electrophotographic member according to at least one embodiment of the present disclosure is described below with reference to the drawings.

Figure 4:
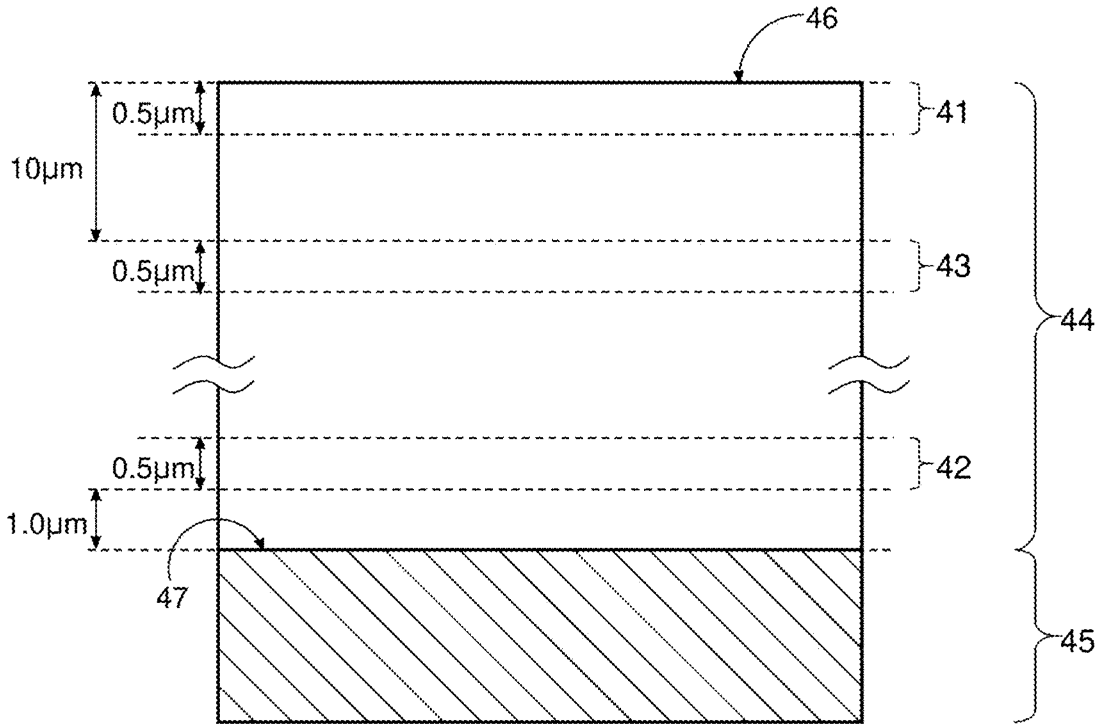
FIG. 4 is a schematic view for illustrating an example of a section of the electrophotographic member according to one aspect of the present disclosure.

FIG. 1 is a sectional view in a circumferential direction of an electrophotographic member including an electroconductive substrate 2 and an elastic layer 1 on an outer peripheral surface of the substrate. The elastic layer 1 and the electroconductive substrate 2 are identical in meaning to an elastic layer 44 and an electroconductive substrate 45 illustrated in FIG. 4, respectively. A side of the elastic layer 44 facing the electroconductive substrate 45 is defined as a second surface 47, and a surface of the elastic layer 44 opposite to the second surface 47 is defined as a first surface 46. In addition, in the present disclosure, as illustrated in FIG. 4, a region having a thickness of up to 0.5 μm from the first surface 46 toward the second surface 47 is specified as a first region 41. In addition, a region corresponding to a thickness of 1.0 μm to 1.5 μm from the second surface 47 toward the first surface 46 is specified as a second region 42. Further, a region corresponding to a thickness of 10.0 μm to 10.5 μm from the first surface 46 toward the second surface 47 is specified as a third region 43.

The electrophotographic member according to at least one embodiment of the present disclosure includes the electroconductive substrate 2 and the monolayer elastic layer 1 on the substrate. The elastic layer contains a silicone rubber containing a dimethylsiloxane structure. Herein, the peak top temperature of an ion thermogram derived from the dimethylsiloxane structure, the ion thermogram being measured from a first sample sampled from the first region 41, is represented by T1 (° C.). Similarly, the peak top temperature of an ion thermogram derived from the dimethylsiloxane structure, the ion thermogram being measured from a second sample sampled from the second region 42, is represented by T2 (° C.). The elastic layer according to this embodiment satisfies a relationship represented by the following formula (1) for T1 and T2.

$$T1>T2 \quad \text{Formula (1)}$$

In the elastic layer satisfying the formula (1), the difference "T1−T2" preferably falls within the range of 3.3° C. to 9.1° C., and more preferably falls within the range of 3.3° C. to 6.1° C. In addition, T1 preferably falls within the range of 468.1° C. to 470.8° C.

Although the thickness of the elastic layer satisfying the formula (1) is not particularly limited, the thickness is set to preferably 0.1 mm to 6.0 mm, particularly preferably 0.3 mm to 6.0 mm, more preferably 1.0 mm to 6.0 mm from the viewpoint of achieving both of the alleviation of a stress to be applied to toner and the prevention of the wear of its outer surface at higher levels.

For example, an ion trap-type mass spectrometer (product name: Polaris Q; manufactured by Thermo Fisher Scientific, Inc.) may be used in the measurement of the peak top temperatures of the ion thermograms.

First, the corresponding measurement regions are each shaved into a flaky shape with a microtome, and a measurement sample is shaved out of the flake. The resultant measurement sample is fixed to a filament positioned at the tip of the Direct Exposure probe of the mass spectrometer, and is directly inserted into the ionization chamber thereof. After that, the sample is rapidly heated from room temperature to a temperature of 700° C. at a constant heating rate. The sample that has been decomposed and evaporated by the heating is ionized by electron beam irradiation, and is detected with the mass spectrometer. At this time, under such a condition that the heating rate is constant, a thermogram similar to that of a thermogravimetry-mass spectrometry (TG-MS) method, the thermogram having a mass spectrum called a total ion thermogram (TIT), is obtained.

A material may be identified from the resultant thermogram with, for example, data acquisition and analysis software (product name: Xcalibur; manufactured by Thermo Fisher Scientific, Inc.). In addition, an ion thermogram for a predetermined mass fragment can be obtained, and hence the peak top temperature of an ion thermogram corresponding to the decomposition temperature of a desired molecular structure can be obtained. The shift of the peak top temperature of an ion thermogram for the same molecular structure to higher temperatures means that the decomposition of the molecular structure does not occur unless the temperature thereof is increased to higher values. Such phenomenon may be caused by, for example, a reduction in molecular mobility of a polymer having the molecular structure.

When the foregoing is applied to the elastic layer according to the present disclosure, the fact that T1 is more than T2 means that the molecular mobility of the silicone rubber in the first region is reduced as compared to the molecular mobility of the silicone rubber in the second region. Thus, there can be obtained an elastic layer having an outer surface improved in wear resistance while maintaining the flexibility of the silicone rubber.

A method of making the molecular mobility of the silicone rubber in the first region lower than the molecular mobility of the silicone rubber in the second region includes, for example, at least one method selected from the group consisting of: a method including increasing the crosslinking degree of the silicone rubber in the surface region; and a method including surrounding the peripheries of the molecules of the silicone rubber in the surface region with any other polymer.

A method of obtaining an elastic layer in which the crosslinking degree of the silicone rubber in its surface region is higher than the crosslinking degree of the silicone rubber in a region deeper than the surface region is, for example, a method including applying an electron beam (EB) from the outer surface side of a silicone rubber-containing layer that should serve as the elastic layer.

In addition, examples of a method of obtaining an elastic layer in which the periphery of the silicone rubber in its surface region is surrounded with any other polymer include: a method including impregnating a liquid containing the other polymer in a dissolved state from the outer surface of the silicone rubber-containing layer that should serve as the elastic layer; and a method including impregnating the silicone rubber-containing layer with a liquid containing a raw material (e.g., a monomer, an oligomer, or a prepolymer) for the other polymer, and then curing the raw material. Each of those methods may hereinafter also be referred to as "impregnation method."

As described above, an example of the impregnation method includes: impregnating a monomer serving as the raw material for the other polymer from the outer surface of the silicone rubber-containing layer into a region corresponding to the surface region; and curing the monomer in the corresponding region. The surface region of the elastic layer obtained as a result of the foregoing contains the silicone rubber and the polymer different from the silicone rubber. Meanwhile, in at least part of a region deeper than the surface region of the elastic layer, a polymer derived from the monomer is absent because the monomer is not impregnated thereinto even by the above-mentioned impregnation treatment.

That is, the electrophotographic member according to one embodiment of the present disclosure, which is obtained by the impregnation method, satisfies the above-mentioned condition represented by the formula (1), and the first sample contains a polymer that the second sample is free of. The peak top temperature of an ion thermogram derived from the polymer, the ion thermogram being measured from the first sample, is represented by C1 (° C.). In addition, the peak top temperature of an ion thermogram derived from the polymer, the ion thermogram being measured from a third sample obtained by decomposing the silicone rubber in the first sample, is represented by C2 (° C.). In the electrophotographic member according to one embodiment of the present disclosure, C1 and C2 preferably satisfy a relationship represented by the following formula (2).

$$C1>C2 \quad \text{Formula (2)}$$

In the elastic layer satisfying the formula (2) in addition to the formula (1), C1 preferably falls within the range of 414.2° C. to 423.4° C., the difference "C1−C2" preferably falls within the range of 0.9° C. to 3.6° C., and T1 preferably falls within the range of 468.1° C. to 470.8° C. In addition, the difference "T1−T2" preferably falls within the range of 3.3° C. to 9.1° C., and more preferably falls within the range of 3.3° C. to 6.1° C.

Although the thickness of the elastic layer satisfying the formula (1) and the formula (2) is not particularly limited, the thickness is set to preferably 0.1 mm to 6.0 mm, particularly preferably 0.3 mm to 6.0 mm, more preferably 1.0 mm to 6.0 mm from the viewpoint of achieving both of the alleviation of a stress to be applied to toner and the prevention of the wear of its outer surface at higher levels.

Examples of a method of decomposing the silicone rubber include a tetraethoxysilane (TEOS) method, an alkali fusion method, a fluorosilanization method, and a methyl orthoformate (MOF) decomposition method each including selectively decomposing a siloxane bond of the silicone rubber. When the dimethylsiloxane structure derived from the silicone rubber is removed by any one of those methods, the third sample containing the polymer from which the dimethylsiloxane structure has been removed can be obtained.

The peak top temperatures of the ion thermograms derived from the polymer each have a correlation with the crosslinking degree of the polymer. Accordingly, the fact that C1 before the removal of the silicone rubber is higher than C2 after the removal of the silicone rubber means that the crosslinking degree of the polymer before the removal of the dimethylsiloxane structure is higher than that after the removal, or in other words, the hardness thereof before the removal is higher than that after the removal.

Accordingly, when both the relationships represented by the formula (1) and the formula (2) described above are satisfied, the polymer may enter a network structure and a spiral structure between the molecules of the silicone polymer for forming the elastic layer. It is suggested that as a result of the foregoing, there is formed an interpenetrating polymer network structure in which the respective network structures of the silicone rubber and the polymer are intertwined and entangled with each other without being bonded to each other through a covalent bond. The interpenetrating polymer network structure is hereinafter referred to as "IPN structure."

The interpenetrating polymer network structure (IPN structure) is defined as a structure in which the network structures of two or more kinds of polymer compounds are intertwined and entangled with each other without being bonded to each other through a covalent bond. The materials for forming the IPN structure have no chemical bond therebetween, and hence the characteristics of each material are not impaired. Meanwhile, an improvement in strength of the structure by the entanglement of the materials with each other is expected.

The IPN structure in the elastic layer according to this aspect is formed by the entry of the polymer into the network of the three-dimensional crosslinked structure of the silicone rubber. The IPN structure is not loosened unless the molecular chains of the polymer compounds for forming its network are cleaved. Examples of a method of forming the IPN structure may include several methods. For example, the following method called a sequential network formation method is available: the network of the polymer of a first component is formed in advance; next, the polymer is swollen with the monomer of a second component and, as required, a polymerization initiator; and then, the network of the polymer of the second component is formed. Alternatively, for example, the following simultaneous network formation method is available: the monomer of the first component and the monomer of the second component having reaction mechanisms different from each other, and polymerization initiators for the respective monomers are mixed, and the monomers are simultaneously polymerized to form their network structures.

The silicone rubber serving as the first component and the polymer of the second component, which form the IPN structure, basically have no covalent bond therebetween, and hence the rubber elasticity of the structure is not impaired. Meanwhile, an improvement in strength thereof by the entanglement of the silicone rubber and the polymer of the second component with each other is expected. Further, the properties of the spiral structure peculiar to the silicone rubber and the IPN structure may be combined with each other to exhibit a synergistic effect.

Accordingly, the elastic layer can maintain the flexibility inside thereof due to the silicone rubber, whereas the elastic layer has hardened only at the extreme outermost surface thereof by the formation of the IPN structure. As a result of that, it is conceivable that the elastic layer can achieve both of a further improvement in wear resistance and a reduction in stress of which the electrophotographic member gives to the toner.

Further, a silicone rubber containing, as a main component, a silicone polymer whose molecules have more uniformized molecular weights is preferably used in the formation of the IPN structure. When the IPN structure is formed in the silicone rubber, the monomer of the second component more uniformly infiltrates the silicone rubber with ease, and hence the monomer of the second component enters the network structure of the silicone rubber easily as compared to the case where the IPN structure is formed in a silicone rubber whose molecules have nonuniform molecular weights. As a result, the molecular motion of the silicone rubber can be uniformly restricted, and hence the shaving of the electrophotographic member and filming on the surface thereof can be suppressed at higher levels.

Preferred examples of the polymer of the second component include an acrylic resin, an epoxy resin, and a urethane resin. Although polymer materials, such as the acrylic resin, the epoxy resin, and the urethane resin, each typically have high strength, each of the materials may be hard and brittle when used alone.

Accordingly, when the polymer is used as a single film in the surface layer of the electrophotographic member, owing to its brittleness, the polymer is liable to be worn by rubbing to cause the shaving. In addition, the polymer may be responsible for the deterioration of toner and the filming because the polymer has a high hardness, and hence a load on the toner is liable to be large. Meanwhile, when the polymer is introduced as an IPN structure with the silicone rubber having the spiral structure, its hardness and brittleness are hardly expressed because its crystallinity is broken.

The respective resin materials and methods of impregnating the materials into the elastic layer of the electrophotographic member are described below. A treatment liquid for impregnation containing a monomer component for each of the resins is referred to as "impregnation treatment liquid."

(1) Acrylic Resin

The acrylic resin is, for example, a resin containing such a constituent unit derived from a (meth)acryloyl group as represented by the structural formula (I):

Structural formula (I)

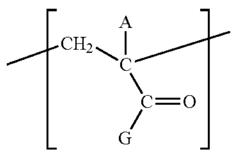

In the structural formula (I), A represents a hydrogen atom or a methyl group, G represents —O—R' or —$NR^2R^3$, $R^1$, $R^2$, and $R^3$ each independently represent a hydrogen atom or an organic group, and $R^2$ and $R^3$ may be linked to each other to form a ring.

The presence of the structural formula (I) may be judged by the presence or absence of the detection of a compound derived from a (meth)acryloyl group by general mass spectrometry such as pyrolysis GC/MS.

The acrylic resin is formed by the polymerization of one or both of an acrylic monomer and a methacrylic monomer. In this specification, the term "acrylic" and the term "methacrylic" may be collectively referred to as "(meth)acrylic". Similarly, the term "acryloyl" and the term "methacryloyl" may be collectively referred to as "(meth)acryloyl".

To form a crosslinked structure, a polyfunctional monomer having a plurality of acryloyl groups or methacryloyl groups as its functional groups is preferred as the acrylic monomer. Meanwhile, when the number of the functional groups is 4 or more, the viscosity of the acrylic monomer becomes so high that the monomer hardly infiltrates the surface of the elastic layer containing the silicone rubber, and as a result, an IPN structure is hardly formed. Accordingly, such a monomer that the total number of an acryloyl group and a methacryloyl group present in a molecule thereof is two or three is preferred as the acrylic monomer, and a more preferred example thereof is a bifunctional acrylic monomer having two such groups.

The molecular weight of the acrylic monomer preferably falls within the range of 200 to 750. When the acrylic monomer having a molecular weight within the range is used, the IPN structure is easily formed for the network structure of the silicone rubber, and hence the strength of the elastic layer can be effectively improved.

As described above, in a production process for the electrophotographic member according to the present disclosure, the acrylic monomer is impregnated into the elastic layer containing the silicone rubber. To that end, the acrylic monomer preferably has such a viscosity as to be capable of being impregnated into the silicone rubber. Specifically, for example, the viscosity of an impregnation treatment liquid containing the acrylic monomer at a temperature of 25° C. is preferably 5.0 mPa·s to 140 mPa·s.

Any solvent may be freely selected as the solvent of the impregnation treatment liquid as long as the solvent satisfies both of an affinity for the elastic layer and solubility for the acrylic monomer. Examples thereof include: alcohols, such as methanol, ethanol, and n-propanol; ketones, such as acetone, methyl ethyl ketone, and methyl isobutyl ketone; and esters, such as methyl acetate and ethyl acetate.

The IPN structure of the silicone rubber and the acrylic resin may be formed by: impregnating an impregnation treatment liquid for which one or two or more kinds of acrylic monomers each satisfying the molecular weight range and the viscosity range described above have been selected into the elastic layer; and polymerizing the monomers.

A method of polymerizing the acrylic monomer is not particularly limited, and a known method may be used. Specific examples thereof include thermal polymerization based on heating and photopolymerization based on UV irradiation.

A known radical polymerization initiator or ionic polymerization initiator may be used for each of the polymerization methods. Thus, the impregnation treatment liquid to be used contains the acrylic monomer and any such polymerization initiator.

A thermal polymerization initiator when the thermal polymerization is performed is, for example: a peroxide, such as 3-hydroxy-1,1-dimethylbutyl peroxyneodecanoate, α-cumyl peroxyneodecanoate, t-butyl peroxyneoheptanoate, t-butyl peroxypivalate, t-amylperoxy n-octoate, t-butylperoxy 2-ethylhexyl carbonate, dicumyl peroxide, di-t-butyl peroxide, di-t-amyl peroxide, 1,1-di(t-butylperoxy)cyclohexane, or n-butyl-4,4-di(t-butylperoxy)valerate; or an azo compound, such as 2,2-azobisisobutyronitrile, 2,2-azobis(4-methoxy-2,4-dimethylvaleronitrile), 2,2-azobis(2,4-dimethylvaleronitrile), 2,2-azobis(2-methylbutyronitrile), 1,1-azobis(cyclohexane-1-carbonitrile), 2,2-azobis[2-(2-imidazolin-2-yl)propane], 2,2-azobis[2-methyl-N-(2-hydroxyethyl)propionamide], 2,2-azobis[N-(2-propenyl)-2-methylpropionamide], 2,2-azobis(N-butyl-2-methoxypropionamide), or dimethyl-2,2-azobis (isobutyrate).

A photopolymerization initiator when the photopolymerization based on UV irradiation is performed is, for example, 2,2-dimethoxy-1,2-diphenylethan-1-one, 1-hydroxycyclohexyl phenyl ketone, 2-hydroxy-2-methyl-1-phenylpropan-1-one, 1-[4-(2-hydroxyethoxy)-phenyl]-2-hydroxy-2-methyl-1-propan-1-one, 2-hydroxy-1-{4-[4-(2-hydroxy-2-methyl-propionyl)-benzyl]-phenyl}-2-methylpropan-1-one, 2-methyl-1-[4-(methylthio)phenyl]-2-morpholinopropan-1-one, 2-benzyl-2-dimethyl amino-1-(4-morpholinophenyl)-butan-1-one, 2-dimethylamino-2-(4-methylbenzyl)-1-(4-morpholin-4-yl-phenyl)-butan-1-one, bis(2,4,6-trimethylbenzoyl)-phenylphosphine oxide, or 2,4,6-trimethylbenzoyl-diphenylphosphine oxide.

Those polymerization initiators may be used alone or in combination thereof.

In addition, with regard to the blending amount of the polymerization initiator, when the total amount of a compound for forming a specific resin (e.g., a compound having a (meth)acryloyl group) is defined as 100 parts by mass, the initiator is preferably used in an amount of 0.5 part by mass to 10 parts by mass from the viewpoint of efficiently advancing a reaction for the formation of the resin.

A known device may be appropriately used as a device for heating or a device for UV irradiation. For example, an LED lamp, a high-pressure mercury lamp, a metal halide lamp, a xenon lamp, and a low-pressure mercury lamp may each be used as a light source for applying UV light. An integrated light quantity required at the time of the polymerization may be appropriately adjusted in accordance with the kinds and addition amounts of the compound and the polymerization initiator to be used.

(2) Epoxy Resin

The epoxy resin is, for example, a resin having a group derived from an epoxy group, the group being represented by the structural formula (II).

Structural formula (II)

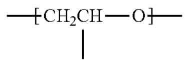

The presence of the structural formula (II) may be judged by the presence or absence of the detection of a compound derived from an epoxy group by general mass spectrometry such as pyrolysis GC/MS.

The epoxy resin is preferably, for example, a polymer formed by the ring-opening addition polymerization of a glycidyl group as represented by the following structural formula (III). Herein, R represents a divalent organic group, and particularly preferably represents an alkylene group.

Structural formula (III)

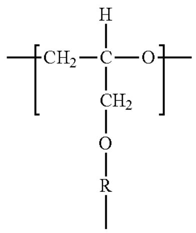

A monomer that provides the polymer represented by the structural formula (III) may be, for example, a bifunctional glycidyl ether monomer having, in its main chain, an R structure in the structural formula (III) as represented by the following structural formula (IV).

Structural formula (IV)

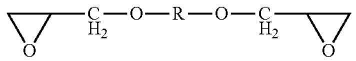

An alkyl glycidyl ether is suitably used as the glycidyl ether monomer represented by the structural formula (IV). Examples thereof include ethylene glycol diglycidyl ether, propylene glycol diglycidyl ether, 1,4-butanediol diglycidyl ether, 1,5-pentanediol glycidyl ether, neopentyl glycol diglycidyl ether, and 1,6-hexanediol diglycidyl ether.

The glycidyl ether monomer is preferably a low-molecular weight glycidyl ether from the viewpoint of the ease of impregnation into the elastic layer. In addition, an aliphatic glycidyl ether monomer, which is free of any rigid structure in its main chain and hence has a low viscosity, is preferred from the same viewpoint because a monomer having a lower viscosity is more easily impregnated thereinto. The above-mentioned specific examples of the alkyl glycidyl ether monomer each satisfy those conditions.

Any solvent may be freely selected as the solvent as long as the solvent satisfies both of an affinity for the elastic layer and solubility for the glycidyl ether monomer. Examples thereof include: alcohols, such as methanol, ethanol, and n-propanol; ketones, such as acetone, methyl ethyl ketone, and methyl isobutyl ketone; and esters, such as methyl acetate and ethyl acetate. In addition, the impregnation treatment liquid may be appropriately mixed with a polymerization initiator. Details about the polymerization initiator are described later.

The IPN structure of the silicone rubber and the epoxy resin may be formed by: impregnating an impregnation treatment liquid for which one or two or more kinds of the above-mentioned glycidyl ether monomers have been selected into the elastic layer; and polymerizing the monomers.

A method for the polymerization is not particularly limited, and a known method may be used. Specific examples thereof include methods, such as heat curing and UV irradiation. In particular, a method including curing the glycidyl ether monomer through UV irradiation is more preferred because the glycidyl ether monomer can be efficiently polymerized and cured in a system without its volatilization to the outside of the system due to the application of excessive heat to the monomer.

Known polymerization initiators, such as a radical polymerization initiator and an ionic polymerization initiator, may be used for the respective polymerization methods. Specific examples thereof may include the same polymerization initiators as the polymerization initiators for the acrylic resin. Of those, a cationic polymerization initiator containing an aromatic sulfonium salt as a main component is preferred. Those polymerization initiators may be used alone or in combination thereof.

In addition, with regard to the blending amount of the polymerization initiator, when the total amount of a compound for forming a specific resin (e.g., a compound having a glycidyl group) is defined as 100 parts by mass, the polymerization initiator is preferably used in an amount of 0.5 part by mass to 10 parts by mass from the viewpoint of efficiently advancing a reaction for the formation.

A known device may be appropriately used as a device for heating or a device for UV irradiation. For example, an LED lamp, a high-pressure mercury lamp, a metal halide lamp, a xenon lamp, and a low-pressure mercury lamp may each be used as a light source for applying UV light. An integrated light quantity required at the time of the polymerization may be appropriately adjusted in accordance with the kinds and addition amounts of the compound and the polymerization initiator to be used.

(3) Urethane Resin

The urethane resin is, for example, a resin having a urethane bond represented by the structural formula (V).

Structural formula (V)

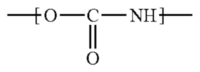

The presence of the urethane bond may be judged by the presence or absence of the detection of a compound derived from a urethane bond by general mass spectrometry such as pyrolysis GC/MS.

The urethane resin is generated by a reaction between an isocyanate compound and a substance having a hydrogen group.

Examples of the isocyanate compound may include 2,6-tolylene diisocyanate (TDI), 4,4'-diphenylmethane diisocyanate (MDI), paraphenylene diisocyanate (PPDI), 1,5-naphthalene diisocyanate (NDI), and 3,3-dimethyldiphenyl-4,4'-diisocyanate (TODI), and multimers and modified products of the above-mentioned isocyanate compounds.

Examples of the substance having a hydrogen group include a compound having a hydroxy group such as a polyol and atmospheric moisture.

Any solvent may be freely selected as the solvent as long as the solvent satisfies both of an affinity for the resin layer and solubility for the isocyanate compound. Examples thereof include: ketones, such as acetone, methyl ethyl ketone, and methyl isobutyl ketone; and esters, such as methyl acetate and ethyl acetate.

The IPN structure of the silicone rubber and the urethane resin may be formed by: impregnating an impregnation treatment liquid for which one or two or more kinds of the above-mentioned isocyanate compounds have been selected into the elastic layer; and heating the layer to cause the compound and the substance having a hydrogen group to react with each other.

In the elastic layer according to the present disclosure, when a fourth sample is sampled from the third region 43 corresponding to a thickness of 10.0 μm to 10.5 μm from the first surface 46 toward the second surface 47 as illustrated in FIG. 4, and when the peak top temperature of an ion thermogram derived from the dimethylsiloxane structure, the ion thermogram being measured from the fourth sample, is represented by T3 (° C.), T1, T2, and T3 preferably satisfy relationships represented by the following formula (3) and the following formula (4).

$$T1>T3\geq T2 \qquad \text{Formula (3)}$$

$$T1>T3+1.0(°\ C.) \qquad \text{Formula (4)}$$

In other words, it is preferred that the first region be increased in hardness as compared to the third region, and the third region have a hardness equal to or higher than that of the second region.

To further reduce a stress applied to toner by a developing roller, the thickness of the high-hardness region of the elastic layer is preferably as small as possible. To that end, a difference (T1−T3) between the peak top temperatures of the first region and the third region is preferably 1.0 (° C.) or more. That is, the thickness of the high-hardness region from the outer surface of the elastic layer in its depth direction can be assumed from the difference (T1−T3) between the peak top temperatures of the first region and the third region. When T1−T3=0° C. in the elastic layer satisfying the relationship represented by the formula (1), which is formed by the impregnation method, the impregnation of any other polymer from the outer surface may reach the third region. In other words, the foregoing fact means that a region from the first surface of the elastic layer to the third region at a depth of 10.5 μm is the high-hardness region. Meanwhile, as the difference "T1−T3" becomes larger, the impregnation of the polymer may remain in the extreme vicinity of the outer surface to a larger extent. To further reduce the stress applied to the toner, the high-hardness region is preferably formed only in the extreme vicinity of the outer surface. Accordingly, the difference "T1−T3" is preferably 0.3° C. to 5.9° C., particularly preferably 0.8° C. to 5.9° C., more preferably 1.3° C. to 5.9° C. In addition, in the elastic layer satisfying the relationships represented by the formula (1) to the formula (4), T1 preferably falls within the range of 468.1° C. to 470.8° C., and the difference "T1−T2" preferably falls within the range of 3.3° C. to 9.1° C., and more preferably falls within the range of 3.3° C. to 6.1° C. Further, in the elastic layer satisfying the formula (2) in addition to the formula (3) and the formula (4), C1 preferably falls within the range of 414.2° C. to 423.4° C., and the difference "C1−C2" preferably falls within the range of 0.9° C. to 3.6° C.

Although the thickness of the elastic layer satisfying the relationships represented by the formula (1) to the formula (4) is not particularly limited, the thickness is set to preferably 0.1 mm to 6.0 mm, particularly preferably 0.3 mm to 6.0 mm, more preferably 1.0 mm to 6.0 mm from the viewpoint of achieving both of the alleviation of the stress to be applied to the toner and the prevention of the wear of its outer surface at higher levels.

[Electroconductive Substrate]

An electroconductive mandrel having a columnar shape or a cylindrical shape may be used as the electroconductive substrate 2. In addition, an electroconductive elastic layer may be arranged on the outer periphery of the mandrel, and in that case, the electroconductive elastic layer and the mandrel are regarded as the electroconductive substrate.

The electroconductive mandrel has an electroconductive outer surface, and the surface of the substrate may be subjected to known surface treatment for the purpose of improving its adhesive property with the elastic layer to be arranged on its outer periphery. Alternatively, an adhesive layer may be arranged thereon. With regard to a material for the substrate, the substrate may include such an electroconductive material as described below:

- a metal or an alloy, such as aluminum, a copper alloy, or stainless steel;
- iron subjected to plating treatment with chromium or nickel; or
- a synthetic resin having conductivity.

[Elastic Layer]

The elastic layer 1 is a monolayer elastic layer, and forms the outer surface of the electrophotographic member. It is because of the following reason that the silicone rubber is selected as a material for the elastic layer: even when any other member is brought into abutment with the rubber material to be used in the electrophotographic member over a long time period, the material hardly causes a permanent compression set in the electroconductive elastic layer.

Although the thickness of the elastic layer is not particularly limited as described above, the thickness is set to preferably 0.1 mm to 6.0 mm, particularly preferably 0.3 mm to 6.0 mm, more preferably 1.0 mm to 6.0 mm from the viewpoint of achieving both of the alleviation of the stress to be applied to the toner and the prevention of the wear of its outer surface at higher levels.

The silicone rubber is classified into two kinds in accordance with its form. One of the kinds is a type called a millable silicone rubber obtained as follows: linear polyorganosiloxane having a high polymerization degree is used; the polyorganosiloxane is blended with a reinforcing filler such as silica to prepare a rubber compound; and then a crosslinking agent is added to the compound, and the mixture is heated to be cured. The other thereof is classified as a liquid silicone rubber of a type in which organopolysiloxane having a polymerization degree lower than that of the millable type is used. The liquid silicone rubber is further classified into a rubber of such a type as to cure in a room and a rubber of such a type as to be cured by heating. The following polymers are each mainly used as a silicone polymer serving as the main component of the silicone rubber: a polymer having a polymerization degree of about 4,000 to about 10,000 in the case of the millable silicone rubber; and a polymer having a polymerization degree of about 100 to about 2,000 in the case of the liquid silicone rubber.

In addition, the elastic layer may be turned into an electroconductive elastic layer by blending the rubber material with a conductivity-imparting agent, such as an electroconductive substance or an ion electroconductive substance.

Examples of the electroconductive substance include the following substances: electroconductive carbon blacks, such as electroconductive carbons, carbons for rubber, and carbons for color (ink); and metals and metal oxides thereof. Specific examples thereof include: high-electroconductive carbons, such as ketjen black EC and acetylene black; carbons for rubber, such as SAF, ISAF, HAF, FEF, GPF, SRF, FT, and MT; carbons for color (ink) each obtained by subjecting carbon black powder to oxidation treatment; and metals, such as copper, silver, and germanium, and metal oxides thereof. Of those, electroconductive carbon blacks [electroconductive carbons, carbons for rubber, and carbons for color (ink)] are preferred because the conductivity can be easily controlled with a small amount thereof.

Examples of the ion electroconductive substance include the following substances: inorganic ion electroconductive substances, such as sodium perchlorate, lithium perchlorate, calcium perchlorate, and lithium chloride; and organic ion electroconductive substances, such as a modified aliphatic dimethylammonium ethosulfate and stearylammonium acetate.

In addition, the elastic layer may further contain, as required, various additives, such as a plasticizer, a filler, an extender, a vulcanizing agent, a vulcanization aid, a crosslinking aid, a curing inhibitor, an antioxidant, an age inhibitor, and a processing aid. Examples of the filler include silica, quartz powder, and calcium carbonate. Those optional components are each blended in an amount in such a range that the function of the elastic layer is not inhibited.

<Forming Method>

A method of forming the elastic layer on the outer periphery of the electroconductive substrate is not particularly limited, and examples thereof may include a mold molding method, an extrusion molding method, an injection molding method, and a coating molding method. An example of the mold molding method may be a method including: first, fixing, to both the ends of a cylindrical mold, dies for holding a mandrel in the mold; forming injection ports in the dies; then arranging the mandrel in the mold; injecting the materials for the elastic layer from the injection ports; heating the mold after the injection at the temperature at which the materials cure; and removing the cured product from the mold. An example of the extrusion molding method may be a method including: coextruding the mandrel and the materials for the elastic layer with a crosshead-type extruder; and curing the materials to form the silicone rubber layer serving as main part of the elastic layer on the periphery of the mandrel.

When the electrophotographic member is used as a roller member, a polishing step of processing the member into a crown shape may be performed after the formation of the silicone rubber layer on the substrate. The term "crown shape" refers to a state formed by polishing the silicone rubber layer in each of both the end portions of the substrate (mandrel) in its longitudinal direction in a larger amount so that the thickness of the silicone rubber layer in the central portion thereof may be large.

In addition, the silicone rubber layer after the polishing may be subjected to pretreatment by a surface modification method, such as corona treatment, flame treatment, or excimer treatment. The performance of the pretreatment can adjust impregnability in subsequent impregnation treatment within a desired range.

After that, to increase the hardness of the surface region of the elastic layer, EB exposure or impregnation treatment is performed. As described for the acrylic monomer, an impregnation treatment liquid is used after having been diluted with a solvent or the like so as to have an appropriate viscosity. Although a method of impregnating the impregnation treatment liquid into the layer is not particularly limited, dip coating, ring coating, spray coating, or roll coating may be utilized.

After the impregnation treatment, UV irradiation treatment or heat curing treatment is performed for causing the respective molecules of the polymer of the second component to react with each other. In the case of the roller member, the crosslinking degree of its surface region can be uniformized by performing UV irradiation while rotating the roller member.

<Catalyst Compound>

A catalyst compound is a catalyst to be used for accelerating an addition curing reaction between the molecules of the silicone polymer.

Examples of the catalyst compound may include the following compounds:

- platinum fine powder; platinum black; chloroplatinic acid; an alcohol-modified chloroplatinic acid; an olefin complex of chloroplatinic acid; and a complex of platinum and an alkenyl siloxane.

A commercial product may be used as the catalyst compound, and specific examples thereof include SIP-6829.2, SIP-6832.2, SIP-6830.3, SIP-6831.2, and SIP-6833.2 (each representing the name of a product manufactured by Gelest Inc.).

Those compounds may be used alone or in combination thereof.

The content of the catalyst compound in a siloxane composition is preferably 1 ppm by mass to 100 ppm by mass from the viewpoint of curing reactivity.

<Other Components>

To the extent that the function of the above-mentioned composition is not inhibited, the composition may contain, in addition to the above-mentioned catalyst compound, various additives, such as a reinforcing property-imparting agent, a curing control agent, an electroconductive agent, a plasticizer, a vulcanizing agent, a vulcanization aid, a crosslinking aid, an antioxidant, an age inhibitor, and a processing aid, as required.

[Electrophotographic Process Cartridge and Electrophotographic Image Forming Apparatus]

An electrophotographic image forming apparatus according to this aspect includes, for example, the following configurations:

- an image-bearing member which can bear an electrostatic latent image;
- a charging device which can charge the image-bearing member;
- an exposing device which can form an electrostatic latent image on the image-bearing member that is charged;
- a developing device which can develop the electrostatic latent image with toner to form a toner image; and
- a transferring device which can transfer the toner image onto a transfer material.

Figure 3:
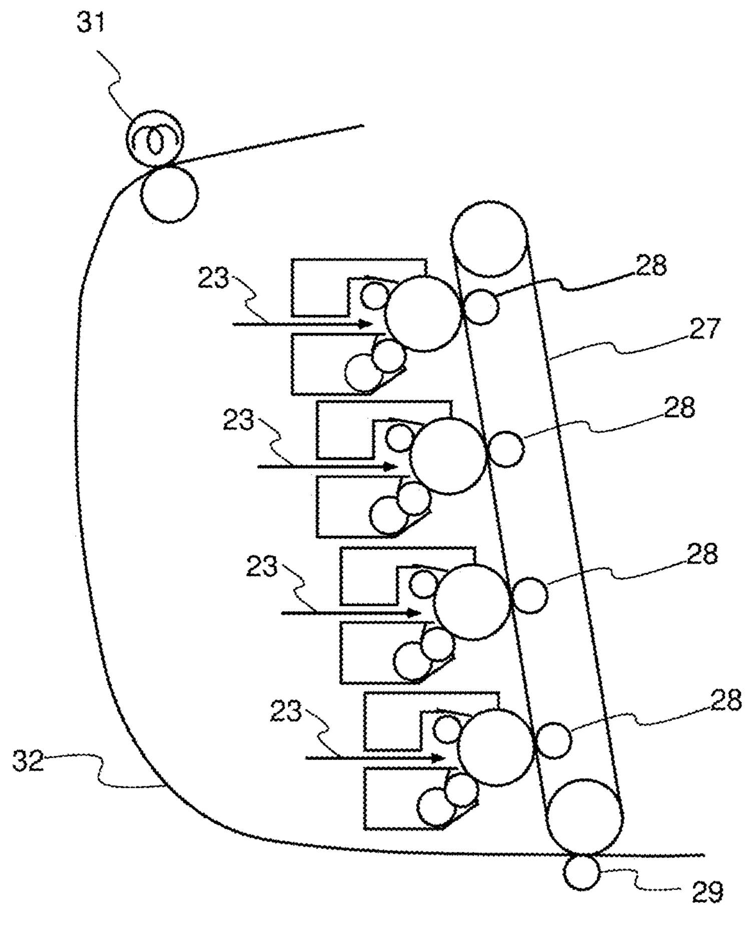
FIG. 3 is a schematic configuration view for illustrating an example of an electrophotographic image forming apparatus according to one aspect of the present disclosure.

FIG. 3 is a sectional view for illustrating the outline of the electrophotographic image forming apparatus according to this aspect.

Figure 2:
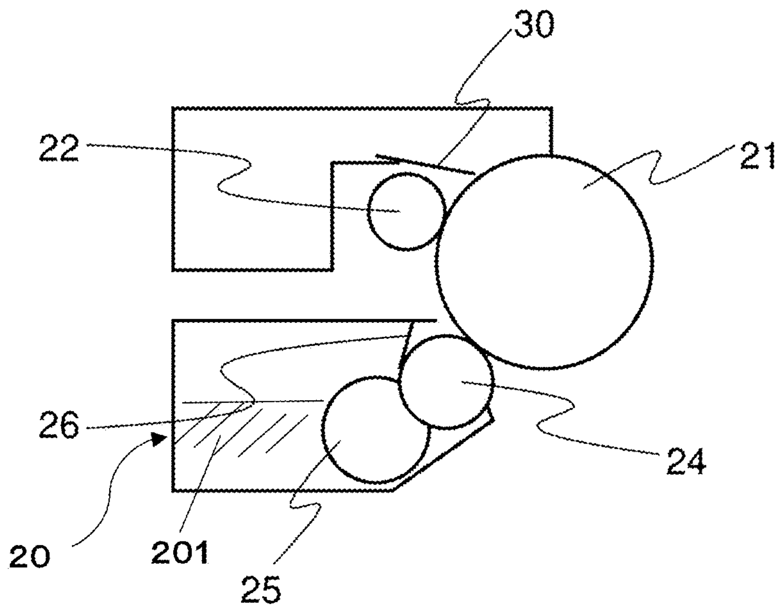
FIG. 2 is a schematic configuration view for illustrating an example of a process cartridge according to one aspect of the present disclosure.

FIG. 2 is an enlarged sectional view of a process cartridge to be mounted onto the electrophotographic image forming apparatus of FIG. 3. The process cartridge has built therein: an image-bearing member 21 such as a photosensitive drum; a charging device including a charging member 22; a developing device 20 including a developing member 24 and a toner-supplying member 25, and storing a toner 201; and a cleaning device including a cleaning member 30. In addition, the process cartridge is removably mountable onto the main body of the electrophotographic image forming apparatus of FIG. 3.

The image-bearing member 21 is uniformly charged (primarily charged) by the charging member 22 connected to a bias power source (not shown). The charging potential of the image-bearing member 21 at this time is −800 V to −400 V. Next, exposure light 23 for writing an electrostatic latent image is applied from an exposing device (not shown) to the image-bearing member 21 to form the electrostatic latent image on its surface. LED light and laser light may each be used as the exposure light 23. The surface potential of the exposed portion of the image-bearing member 21 is −200 V to −100 V.

Next, toner charged to negative polarity is applied to the electrostatic latent image (development is performed) by the developing member 24 to form a toner image on the image-bearing member 21. Thus, the electrostatic latent image is transformed into a visible image. At this time, a voltage of −500 V to −300 V is applied to the developing member 24 by the bias power source (not shown). The developing member 24 is brought into contact with the image-bearing member 21 with a nip width of 0.5 mm to 3 mm therebetween. In the process cartridge of this embodiment, the toner-supplying member 25 is brought into abutment with the developing member 24 under a rotatable state on the upstream side of the rotation of the developing member 24 with respect to an abutting portion between a toner-regulating blade 26 serving as a toner-regulating member and the developing member 24.

The toner image developed on the image-bearing member 21 is primarily transferred onto an intermediate transfer belt 27. A primary transfer member 28 is brought into abutment with the rear surface of the intermediate transfer belt 27, and the application of a voltage of +100 V to +1,500 V to the primary transfer member 28 leads to the primary transfer of the toner image having negative polarity from the image-bearing member 21 onto the intermediate transfer belt 27. The primary transfer member 28 may have a roller shape or a blade shape.

When the electrophotographic image forming apparatus is a full-color image forming apparatus, the electrophotographic image forming apparatus performs the above-mentioned respective steps, that is, the charging, the exposure, the development, and the primary transfer for each of a yellow color, a cyan color, a magenta color, and a black color. Accordingly, in the electrophotographic image forming apparatus illustrated in FIG. 3, a total of four process cartridges each having built therein the toner of one of the respective colors are removably mountable onto the main body of the electrophotographic image forming apparatus. In addition, the above-mentioned respective steps, that is, the charging, the exposure, the development, and the primary transfer are sequentially performed with a predetermined time difference therebetween to establish a state in which four color toner images for representing a full-color image are superimposed on the intermediate transfer belt 27.

The toner images on the intermediate transfer belt 27 are conveyed to a position facing a secondary transfer member 29 along with the rotation of the intermediate transfer belt 27. A recording sheet is conveyed to a space between the intermediate transfer belt 27 and the secondary transfer member 29 at a predetermined timing along a conveyance route 32 for the recording sheet, and the application of a secondary transfer bias to the secondary transfer member 29 leads to the transfer of the toner images on the intermediate transfer belt 27 onto the recording sheet. At this time, the bias voltage to be applied to the secondary transfer member 29 is +1,000 V to +4,000 V. The recording sheet onto which the toner images have been transferred by the secondary transfer member 29 is conveyed to a fixing device 31 by the conveyance route 32 for the recording sheet. In the fixing device 31, the toner images on the recording sheet are melted to be fixed onto the recording sheet, and then the recording sheet is discharged to the outside of the electrophotographic image forming apparatus. Thus, a printing operation is completed.

The toner remaining on the image-bearing member 21 without being transferred from the image-bearing member 21 onto the intermediate transfer belt 27 is scraped off by the cleaning member 30 for cleaning the surface of the image-bearing member 21. Thus, the surface of the image-bearing member 21 is cleaned.

According to at least one aspect of the present disclosure, there can be obtained the electrophotographic member, which can achieve both of suppression of wear of its surface and suppression of deterioration of toner at higher levels even when used in formation of an electronic image under a high-temperature and high-humidity environment over a long time period. According to at least one aspect of the present disclosure, there can be obtained the process cartridge conducive to stable formation of a high-quality electrophotographic image. Further, according to at least one aspect of the present disclosure, there can be obtained the electrophotographic image forming apparatus that can stably form a high-quality electrophotographic image.

EXAMPLES

The present disclosure is described in more detail below by way of specific examples by taking a developing roller as an example. The technical scope of the present disclosure as an electrophotographic member is not limited thereto.

Example 1

[Production of Polished Roller]

A silicone-based primer (product name: "PRIMER No. 16", manufactured by Shin-Etsu Chemical Co., Ltd.) was applied to the surface of a cored bar made of SUS304 having an outer diameter of 6 mm and a length of 264 mm, and was heated at a temperature of 150° C. for 20 minutes. Thus, an electroconductive substrate was prepared.

Next, prior to the formation of an elastic layer, materials shown in Table 1 below were mixed, and were kneaded with a pressure kneader to prepare an addition-curable, millable, and electroconductive silicone rubber composition.

TABLE 1

| Material name | Part(s) by mass |
|---|---|
| Methyl vinyl silicone raw rubber (product name: "KE-78VBS", manufactured by Shin-Etsu Chemical Co., Ltd.) | 100 |
| Dimethyl silicone raw rubber (product name: "KE-76VBS", manufactured by Shin-Etsu Chemical Co., Ltd.) | 20 |
| Carbon black (product name: "ASAHI #8", manufactured by Asahi Carbon Co., Ltd.) | 10 |
| Aerosol silica-based filler (product name: "Zeothix 95", average primary particle diameter: 6.9 μm, bulk density: 0.09 g/cm$^3$, manufactured by J.M. HUBER Corporation) | 15 |
| Platinum catalyst (product name: "STP6830.3", manufactured by Gelest Inc.) | 0.5 |

Next, the electroconductive substrate and the addition-curable, millable, and electroconductive silicone rubber composition thus prepared were integrally sheeted with a crosshead-type extrusion molding machine, and were heated with a gear oven at 250° C. for 20 minutes to be cured. After that, the cured product was further heated with the gear oven at 200° C. for 4 hours to be secondarily cured, and was then left to stand at normal temperature for 24 hours.

Next, the elastic layer formed on the outer periphery of the electroconductive substrate was polished with a cylindrical grinder so as to have an outer diameter of 10 mm and a crown amount of 20 μm. Thus, a polished roller was obtained. The term "crown amount" refers to a difference between an outer diameter at a position distant from each of the end portions of the elastic layer by 10 mm and an outer diameter at the central position of the elastic layer, and the polishing was performed so that the finished crown amount became 20 μm, or specifically, so that the outer diameter at the position distant from each of the end portions of the elastic layer by 10 mm became 10.000 mm, and the outer diameter in the central portion thereof became 10.020 mm.

The outer diameters were measured with a laser length-measuring machine (product names: CONTROLLER LS-7000 and SENSOR HEAD LS-7030R, manufactured by Keyence Corporation) in the longitudinal direction of the elastic layer at a pitch of 10 mm. In addition, the surface roughness of the resultant polished roller was measured with a contact roughness meter (SURFCORDER SE3500, manufactured by Kosaka Laboratory Ltd.). As a result, the surface roughness Ra was 1.05 μm.

[Pretreatment]

Next, the polished roller was subjected to the following treatment serving as pretreatment. An excimer UV lamp (product name: GEL40XTS, manufactured by Harison Toshiba Lighting Corporation) was used as a UV lamp to be used, and the illuminance of light having a wavelength of 172 nm at a position on the surface of the polished roller was measured with a UV integrated light quantity meter (main body: UIT-250, light-receiving portion: VUV-S172, both manufactured by Ushio Inc.). At this time, a distance between the surface and the meter was adjusted so that the illuminance became mW.

The polished roller was irradiated with UV light for an integrated time of 13 seconds so that its integrated light quantity became 200 mJ. Thus, a pretreated roller was obtained.

[Impregnation Treatment]

Next, impregnation treatment was performed. Materials shown in Table 2 below, which served as materials for an impregnation treatment liquid for impregnation treatment, were dissolved and mixed. The pretreated roller was treated by being immersed in the impregnation treatment liquid for 5 seconds. Thus, the impregnation treatment liquid was impregnated into the roller. After that, the solvent was volatilized by: air-drying the roller at normal temperature for 30 minutes; and drying the roller at for 1 hour.

TABLE 2

| Material | Part(s) by mass |
|---|---|
| Bifunctional acrylic monomer (product name: EBECRYL 145, manufactured by Daicel-Allnex Ltd.) | 5 |
| Photopolymerization initiator (product name: IRGACURE 184, manufactured by BASF SE) | 0.25 |
| Solvent (product name: methyl ethyl ketone, manufactured by Kishida Chemical Co., Ltd.) | 100 |

Next, to subject the impregnation treatment liquid to a reaction, the roller after the drying was irradiated with UV light from a UV lamp while being rotated. The roller can be rotated via a rotation mechanism during the UV treatment. The treatment was performed as follows: the roller was irradiated with the UV light while being rotated at a number of revolutions of 20 rpm. A glass plate or the like for preventing the contamination of a filter or the UV lamp may be appropriately arranged between the lamp and the roller. A high-pressure mercury lamp (manufactured by Eye Graphics Co., Ltd.) was used as the UV lamp to be used. The illuminance of light having a wavelength of 365 nm at a position on the surface of the roller was measured with a UV integrated light quantity meter (main body: UIT-250, light-receiving portion: UVD-S365, both manufactured by Ushio Inc.), and the output of the lamp and the distance thereof from the surface were adjusted so that the illuminance became 100 mW.

The acrylic monomer was cured by applying the UV light under the state for 200 seconds so that its integrated light quantity became about 15,000 mJ/cm 2. Thus, a developing roller was obtained.

The resultant developing roller was subjected to the following evaluations.

[Evaluation Method]

<Measurement of T1, T2, T3, C1, and C2>

First, the regions of the developing roller to be subjected to measurement are each shaved and cut out into a flake with a microtome to prepare a sample. In this aspect, as illustrated in FIG. 4, the samples are prepared from 3 regions called the first region 41, the second region 42, and the third region 43. The first region 41 is a region having a thickness of 0.5 μm from the first surface of the elastic layer 44 toward the second surface thereof, and the second region 42 is a region corresponding to a thickness of 1.0 μm to 1.5 μm from the second surface toward the first surface. In addition, the third region 43 is a region corresponding to a thickness of 10.0 μm to 10.5 μm from the first surface toward the second surface. A first sample was collected from the first region, a second sample was collected from the second region, a fourth sample was collected from the third region, and their respective total ion thermograms were obtained. The total ion thermograms were measured with the above-mentioned ion trap-type mass spectrometer (product name: "Polaris Q", manufactured by Thermo Electron Corporation). The peak top temperatures T1, T2, and T3 of ion thermograms derived from a dimethylsiloxane structure in the first region, the second region, and the third region were determined from the resultant total ion thermograms, respectively. In addition, the peak top temperature C1 of an ion thermogram derived from an acrylic resin was determined from the total ion thermogram in the first sample. Further, the peak top temperature C2 of an ion thermogram derived from the acrylic resin was obtained from a total ion thermogram in a third sample obtained through the removal of the silicone rubber in the first sample by a silicone rubber decomposition method to be described later. Herein, the respective peak top temperatures T1, T2, T3, C1, and C2 were each the average of values measured for a total of 30 samples obtained as follows: 10 samples were cut out of the center of the developing roller, and 10 samples were cut out of each of both the end portions thereof.

Flakes cut out with a microtome (product name: "ULTRAMICROTOME", manufactured by Leica Microsystems GmbH) were used as the samples in the respective regions.

Specifically, first, a notch was made with a razor from the surface of the developing roller toward the substrate to cut out a rubber piece in a semi-cylindrical state in which a section of the elastic layer was exposed. The rubber piece was placed in the sample holder of the microtome so that the first surface serving as its outer surface was an upper surface. The first sample was collected from the first region through chipping with a diamond knife, and the fourth sample was collected from the third region through chipping with the diamond knife.

The second sample was collected as follows: the rubber piece was placed in the sample holder of the microtome so that the second surface of the elastic layer was an upper surface, followed by the collection from the second region through chipping with the diamond knife.

<Silicone Rubber Decomposition Method>

To selectively decompose a siloxane bond of the silicone rubber, a silicone resin-dissolving agent (product name: "eSOLVE 21RS", manufactured by Kaneko Chemical Co., Ltd.) was used.

The first sample collected as described above with the microtome was immersed in the silicone resin-dissolving agent so that the silicone rubber was dissolved therein. After that, the solution was filtered with a filter to provide the third sample from which the dimethylsiloxane structure derived from the silicone rubber had been removed.

<Durability Evaluation>

The developing roller was mounted onto a process cartridge for a color laser printer, and a shaving state and a filming state due to the wear of the surface of the developing roller were evaluated with the color laser printer (product name: Color Laser Jet Pro M452dw, manufactured by Hewlett-Packard Company). Evaluation results are shown in Table 4 below. An evaluation procedure is as described below.

The process cartridge was aged by being left to stand under a high-temperature and high-humidity environment at a temperature of 30° C. and a relative humidity of 95% for 16 hours. After that, under the environment, a low-print percentage image having a print percentage of 0.2% was continuously output on a recording sheet. The printing operation was performed until the cartridge exchange lamp of the laser printer lit. After the lighting of the lamp, the image was further printed on additional 500 sheets, and then the developing roller was removed from the process cartridge. Air was blown onto the surface of the roller to remove toner with which the surface was coated, and the developing roller after its endurance was evaluated in accordance with the following evaluation criteria.

<Evaluation Criteria>

An outer diameter at a position to be brought into abutment with the end portion of a blade at each of both ends in the developing roller after the endurance was measured with the laser length-measuring machine (product names: CONTROLLER LS-7000 and SENSOR HEAD LS-7030R, manufactured by Keyence Corporation) used in the outer diameter measurement, and the shaving state was evaluated in accordance with the following evaluation criteria.

Rank "A": The outer diameter of the roller after the endurance changes by an amount of 10 μm or less as compared to the outer diameter of the roller before the endurance.

Rank "B": The outer diameter of the roller after the endurance changes by an amount of more than 10 μm and 30 μm or less as compared to the outer diameter of the roller before the endurance.

Rank "C": The outer diameter of the roller after the endurance changes by an amount of more than 30 μm as compared to the outer diameter of the roller before the endurance, or is unmeasurable owing to shaving.

In addition, the surface of the developing roller after the endurance was observed with a laser microscope (product name: VK-8700, manufactured by Keyence Corporation) and an objective lens having a magnification of 20. The observation was performed at a total of 9 points determined for each sample (i.e., the roller) as follows, and the area of sticking toner at each of the 9 points was determined: the toner-coated portion of the surface was divided into 3 sections in the axial direction of the roller, and was also divided into 3 sections in the circumferential direction thereof. The average of the values measured at the 9 points was adopted as the filming state, and was evaluated in accordance with the following evaluation criteria.

Rank "A": The ratio of the area of the sticking toner to the surface area of the roller is 5% or less.

Rank "B": The ratio of the area of the sticking toner to the surface area of the roller is more than 5% and 15% or less.

Rank "C": The ratio of the area of the sticking toner to the surface area of the roller is more than 15%.

The foregoing evaluation results are shown in Table 4.

Example 2

A developing roller was produced by the same method as that of Example 1 except that the UV irradiation time was changed to 100 seconds, and the roller was evaluated by the same methods as those of Example 1.

Example 3

A developing roller was produced by the same method as that of Example 2 except that an impregnation treatment liquid for introducing an IPN structure based on an epoxy resin was impregnated into the pretreated roller in the impregnation treatment. A liquid obtained by dissolving and mixing the following materials was used as the impregnation treatment liquid: 5 parts by mass of a glycidyl ether monomer (product name: "ethylene glycol diglycidyl ether", manufactured by Tokyo Chemical Industry Co., Ltd.); 0.1 part by mass of a photopolymerization initiator (product name: "SAN-AID SI-100L", manufactured by Sanshin Chemical Industry Co., Ltd.); and 100 parts by mass of a solvent (methyl ethyl ketone). The resultant developing roller was evaluated by the same methods as those of Example 1.

Example 4

A developing roller was produced by the same method as that of Example 2 except that an impregnation treatment liquid for introducing an IPN structure based on a urethane resin was impregnated into the pretreated roller in the impregnation treatment. A liquid obtained by dissolving and mixing the following materials was used as the impregnation treatment liquid: 14.3 parts by mass of an isocyanate compound (product name: "MILLIONATE MR-400", manufactured by Tosoh Corporation); and 100 parts by mass of a solvent (ethyl acetate). The resultant developing roller was evaluated by the same methods as those of Example 1.

Examples 5, 6, and 7

Developing rollers were produced by the same method as that of Example 2 except that the immersion time was changed to 15 seconds, 30 seconds, and 60 seconds, and the rollers were evaluated by the same methods as those of Example 1.

Example 8

A polished roller obtained by the same method as that of Example 1 was subjected to EB treatment to produce a developing roller, and the roller was evaluated by the same methods as those of Example 1. An electron beam irradiation device (manufactured by Iwasaki Electric Co., Ltd.) having a maximum acceleration voltage of 150 kV and a maximum electron current of 40 mA was used in the EB treatment, and a nitrogen gas purge was performed at the time of electron beam irradiation. The treatment was performed under the conditions of an acceleration voltage of 150 kV, an electron current of 35 mA, a treatment speed of 1 m/min, and an oxygen concentration of 100 ppm.

Comparative Example 1

1 Part by mass of monomethyl trimethoxysilane was mixed as a coupling agent into the composition shown in Table 1 to prepare an addition-curable, millable, and electroconductive silicone rubber composition. Next, a polished roller obtained by the same method as that of Example 1 was adopted as a developing roller, and the roller was evaluated by the same methods as those of Example 1.

Comparative Example 2

A polished roller obtained by the same method as that of Example 1 was adopted as a developing roller, and the roller was evaluated by the same methods as those of Example 1.

TABLE 3

| | Various parameters | | |
|---|---|---|---|
| | Kind of polymer | Immersion time | UV irradiation time |
| Example 1 | Acrylic resin | 5 seconds | 200 seconds |
| Example 2 | Acrylic resin | 5 seconds | 100 seconds |

TABLE 3-continued

| | Various parameters | | |
|---|---|---|---|
| | Kind of polymer | Immersion time | UV irradiation time |
| Example 3 | Epoxy resin | 5 seconds | 100 seconds |
| Example 4 | Urethane resin | 5 seconds | — |
| Example 5 | Acrylic resin | 15 seconds | 100 seconds |
| Example 6 | Acrylic resin | 30 seconds | 100 seconds |
| Example 7 | Acrylic resin | 60 seconds | 100 seconds |
| Example 8 | — | — | EB treatment |
| Comparative Example 1 | — | — | — |
| Comparative Example 2 | — | — | — |

TABLE 4

| | Measured value | | | | | | | | | Evaluation item | | | |
|---|---|---|---|---|---|---|---|---|---|---|---|---|---|
| | T1 | T3 | T2 | T1-T3 | T1-T2 | T3-T2 | C1 | C2 | C1-C2 | Shaving | Filming | Shaving rank | Filming rank |
| Example 1 | 470.8 | 464.9 | 464.7 | 5.9 | 6.1 | 0.2 | 423.4 | 419.8 | 3.6 | 3 μm | 2% | A | A |
| Example 2 | 469.2 | 465.0 | 464.9 | 4.2 | 4.3 | 0.1 | 422.8 | 420.2 | 2.6 | 3 μm | 3% | A | A |
| Example 3 | 468.3 | 465.2 | 464.9 | 3.1 | 3.4 | 0.3 | 417.9 | 416.7 | 1.2 | 4 μm | 4% | A | A |
| Example 4 | 468.1 | 465.1 | 464.8 | 3.0 | 3.3 | 0.3 | 414.2 | 412.4 | 1.8 | 4 μm | 4% | A | A |
| Example 5 | 469.2 | 467.9 | 465.1 | 1.3 | 4.1 | 2.8 | 421.6 | 420.0 | 1.6 | 3 μm | 5% | A | A |
| Example 6 | 469.1 | 468.3 | 464.7 | 0.8 | 4.4 | 3.6 | 421.0 | 419.9 | 1.1 | 3 μm | 9% | A | B |
| Example 7 | 469.3 | 469.0 | 464.9 | 0.3 | 4.4 | 4.1 | 421.1 | 420.2 | 0.9 | 3 μm | 12% | A | B |
| Example 8 | 474.2 | 474.0 | 465.1 | 0.2 | 9.1 | 8.9 | — | — | — | 3 μm | 13% | A | B |
| Comparative Example 1 | 475.1 | 474.9 | 475.2 | 0.2 | −0.1 | −0.3 | — | — | — | 3 μm | 22% | A | C |
| Comparative Example 2 | 464.8 | 464.7 | 465.0 | 0.1 | −0.2 | −0.3 | — | — | — | 32 μm | 5% | C | A |

[Discussion of Evaluation Results]

Each of the electrophotographic members of Examples 1 to 8 includes a monolayer elastic layer. In each of the members, the filming was suppressed because the elastic layer contained the silicone rubber, and satisfied the condition of T1>T2.

Further, when Examples 1 to 7 and Example 8 are compared to each other, in each of the electrophotographic rollers according to Examples 1 to 7, the first region contains a polymer that the second region is free of, and the condition of C1>C2 is satisfied. It was able to be recognized that the silicone rubber and the polymer formed an IPN structure in the first region from the first surface serving as the outer surface of the elastic layer of each of the rollers to a depth of 0.5 μm. As a result, even when the electrophotographic rollers according to Examples 1 to 7 were each used as a developing roller in the formation of many electrophotographic images under a severe environment at a high temperature and a high humidity, the evaluation result of the wear of the outer surface was Rank A, and the evaluation result of the filming was also Rank A or Rank B. It was found from those results that each of the electrophotographic rollers according to Examples 1 to 7 had extremely excellent wear resistance, and was able to alleviate a stress to be applied to toner.

When Examples 1 to 5, and Examples 6 and 7 were compared to each other, Examples 1 to 5 each satisfied the condition of (T1−T3)>1.0 (° C.). Accordingly, even when the electrophotographic rollers according to Examples 1 to 5 were each used as a developing roller in the formation of many electrophotographic images under a severe environment at a high temperature and a high humidity, the evaluation result of the wear of the outer surface of the roller was Rank A, and the evaluation result of the filming was also Rank A. It was found from those results that each of the electrophotographic rollers according to Examples 1 to 5 had extremely excellent wear resistance, and was able to further alleviate the stress to be applied to the toner.

In addition, when Example 1 and Example 2 were compared to each other, the value of the difference "T1−T3" in Example 1 was larger than that in Example 2. Accordingly, the electrophotographic roller according to Example 1 had a filming-suppressing effect larger than that of the electrophotographic roller according to Example 2.

The electrophotographic roller according to Comparative Example 1 included an elastic layer formed by using the silicone rubber blended with the silane coupling agent. The elastic layer does not satisfy the condition of T1>T2. In addition, it is conceivable that the entirety of the elastic layer was increased in hardness because the silicone rubber was crosslinked by the silane coupling agent in the elastic layer. As a result, the evaluation rank concerning wear resistance was Rank A, but the evaluation rank of the filming was Rank C.

The electrophotographic roller according to Comparative Example 2 included an elastic layer formed by using the silicone rubber that was not mixed with any silane coupling agent. The elastic layer did not satisfy the relationship of T1>T2. In addition, the entirety of the elastic layer was soft. Accordingly, the evaluation result of the filming was Rank A, but the evaluation result concerning wear resistance was Rank C.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-104934, filed Jun. 29, 2022, and Japanese Patent Application No. 2023-087072, filed May 26, 2023, which are hereby incorporated by reference herein in their entirety.

What is claimed is:

1. An electrophotographic member, comprising:

an electroconductive substrate; and an elastic layer on the substrate, the elastic layer being a single layer and containing a silicone rubber having a dimethylsiloxane structure, wherein when a side of the elastic layer facing the substrate is defined as a second surface, and a surface of the elastic layer opposite the second surface is defined as a first surface, and a peak top temperature of an ion thermogram is derived from the dimethylsiloxane structure, T1>T2 when T1 (° C.) is an ion thermogram measured from a first sample sampled from a first region having a thickness of 0.5 μm from the first surface toward the second surface, the first sample containing a polymer that is an epoxy resin, and T2 (° C.) is an ion thermogram measured from a second sample sampled from a second region corresponding to a thickness of 1.0 to 1.5 μm from the second surface of the elastic layer toward the first surface, the second sample not containing the polymer, and when a peak top temperature of an ion thermogram is derived from the polymer, C1>C2 when C1 (° C.) is an ion thermogram measured from the first sample, and C2 (° C.) is an ion thermogram measured from a third sample obtained by decomposing the silicone rubber in the first sample.

2. The electrophotographic member according to claim 1, wherein T1-T2 is 3.3 to 9.1° C.

3. The electrophotographic member according to claim 1, wherein C1-C2 is 0.9 to 3.6° C.

4. The electrophotographic member according to claim 1, wherein when a peak top temperature of an ion thermogram is derived from the dimethylsiloxane structure, T1>T3>T2 when T3 (° C.) is an ion thermogram being measured from a fourth sample sampled from a third region corresponding to a thickness of 10.0 to 10.5 μm from the first surface of the elastic layer toward the second surface.

5. The electrophotographic member according to claim 4, wherein T1-T3 is 0.3 to 5.9° C.

6. The electrophotographic member according to claim 4, wherein T1>T3+1.0 (° C.).

7. The electrophotographic member according to claim 6, wherein T1-T3 is 1.3 to 5.9° C.

8. The electrophotographic member according to claim 1, wherein the elastic layer has a thickness of 0.1 to 6.0 mm.

9. The electrophotographic member according to claim 1, wherein the electrophotographic member is a developing roller.

10. An electrophotographic process cartridge removably mountable onto a main body of an electrophotographic image forming apparatus, the electrophotographic process cartridge comprising:

an electrophotographic member, the electrophotographic member comprising an electroconductive substrate and an elastic layer on the substrate, the elastic layer being a single layer and containing a silicone rubber having a dimethylsiloxane structure, wherein when a side of the elastic layer facing the substrate is defined as a second surface, and a surface of the elastic layer opposite the second surface is defined as a first surface, and a peak top temperature of an ion thermogram is derived from the dimethylsiloxane structure, T1>T2 when T1 (° C.) is an ion thermogram measured from a first sample sampled from a first region having a thickness of 0.5 μm from the first surface toward the second surface, the first sample containing a polymer that is an epoxy resin, and T2 (° C.) is an ion thermogram measured from a second sample sampled from a second region corresponding to a thickness of 1.0 to 1.5 μm from the second surface of the elastic layer toward the first surface, the second sample not containing the polymer, and when a peak top temperature of an ion thermogram is derived from the polymer, C1>C2 when C1 (° C.) is an ion thermogram measured from the first sample, and C2 (° C.) is an ion thermogram measured from a third sample obtained by decomposing the silicone rubber in the first sample.

11. The electrophotographic process cartridge according to claim 10, wherein the electrophotographic process cartridge further comprises a developing device storing toner, and comprises the electrophotographic member as a developing roller.

12. An image forming apparatus, comprising:

an image-bearing member configured to bear an electrostatic latent image;

a charging device configured to charge the image-bearing member;

an exposing device configured to form an electrostatic latent image on the charged image-bearing member;

a developing member configured to develop the electrostatic latent image with toner to form a toner image; and a transferring device configured to which can transfer the toner image onto a transfer material;

the developing member being an electrophotographic member comprising an electroconductive substrate and a monolayer elastic layer on the substrate, the elastic layer containing a silicone rubber containing a dimethylsiloxane structure, wherein when a side of the elastic layer facing the substrate is defined as a second surface, and a surface of the elastic layer opposite the second surface is defined as a first surface, and a peak top temperature of an ion thermogram is derived from the dimethylsiloxane structure, T1>T2 when T1 (° C.) is an ion thermogram measured from a first sample sampled from a first region having a thickness of 0.5 μm from the first surface toward the second surface, the first sample containing a polymer that is an epoxy resin, and T2 (° C.) is an ion thermogram measured from a second sample sampled from a second region corresponding to a thickness of 1.0 to 1.5 μm from the second surface of the elastic layer toward the first surface, the second sample not containing the polymer, and when a peak top temperature of an ion thermogram is derived from the polymer, C1>C2 when C1 (° C.) is an ion thermogram measured from the first sample, and C2 (° C.) is an ion thermogram measured from a third sample obtained by decomposing the silicone rubber in the first sample.

* * * * *